(12) United States Patent
Kessling

(10) Patent No.: US 9,844,256 B2
(45) Date of Patent: Dec. 19, 2017

(54) INSTRUMENT MOUNT

(71) Applicant: Tonal Innovation LLC, Baton Rouge, LA (US)

(72) Inventor: Garrett Kessling, Baton Rouge, LA (US)

(73) Assignee: Tonal Innovation LLC, Baton Rouge, LA (US)

( * ) Notice: Subject to any disclaimer, the term of this patent is extended or adjusted under 35 U.S.C. 154(b) by 0 days.

(21) Appl. No.: 15/097,154

(22) Filed: Apr. 12, 2016

(65) Prior Publication Data
US 2016/0307550 A1    Oct. 20, 2016

Related U.S. Application Data

(60) Provisional application No. 62/147,859, filed on Apr. 15, 2015.

(51) Int. Cl.
*G10G 5/00* (2006.01)
*A45F 5/00* (2006.01)
*F16M 13/02* (2006.01)
*F16B 2/12* (2006.01)

(52) U.S. Cl.
CPC .................. *A45F 5/00* (2013.01); *F16B 2/12* (2013.01); *F16M 13/02* (2013.01); *G10G 5/00* (2013.01); *G10G 5/005* (2013.01); *A45F 2200/0516* (2013.01); *A45F 2200/0525* (2013.01)

(58) Field of Classification Search
USPC .... 248/689, 441.1, 443, 448, 449, 451, 452, 248/453, 187.1
See application file for complete search history.

(56) References Cited

U.S. PATENT DOCUMENTS

| | | | | |
|---|---|---|---|---|
| 791,463 A * | 6/1905 | Gordon | ................ | A47B 23/042 248/452 |
| 857,504 A * | 6/1907 | Waldteufel | ............... | G10G 7/00 248/443 |
| 1,539,042 A * | 5/1925 | Dennis | ................ | A47B 23/004 248/443 |
| 2,828,576 A * | 4/1958 | Fismen | ................ | A47B 23/004 248/444 |
| 2,832,172 A * | 4/1958 | Shelp | .................. | A47B 23/004 248/443 |

(Continued)

OTHER PUBLICATIONS

Giardinelli Trumpet Lyre Clamp on from http://www.musiciansfriend.com/marching-band/giardinelli-trumpet-lyre-clamp-on, Apr. 10, 2015.

(Continued)

*Primary Examiner* — Bradley Duckworth
(74) *Attorney, Agent, or Firm* — John B. Edel; Edel Patents LLC

(57) ABSTRACT

Mounting apparatus useable with instruments and mobile electronic devices are disclosed which may contain a base structure, an upper support structure and an intermediate member. The base structure may contain a lyre clip attachment plate configured to attach to a lyre clip, which may in turn be connected to a musical instrument such as a wind instrument. The upper support structure and the base structure may both be configured to be pinned in a fixed position along the intermediate member in a manner that can accommodate a significant variety of mobile electronic devices.

6 Claims, 5 Drawing Sheets

(56) References Cited

U.S. PATENT DOCUMENTS

| | | | | | |
|---|---|---|---|---|---|
| 2,915,849 | A | * | 12/1959 | Johnston | A47B 23/004 248/443 |
| 3,140,558 | A | * | 7/1964 | Cassidy | A47B 23/043 248/448 |
| 3,536,289 | A | * | 10/1970 | Johnston | A47B 23/004 248/443 |
| 3,539,143 | A | * | 11/1970 | Johnston | A47B 23/004 24/67.5 |
| 3,543,633 | A | * | 12/1970 | Batten | A47B 23/004 248/229.23 |
| 3,638,898 | A | * | 2/1972 | Shaw | A47B 19/002 248/224.8 |
| 3,653,623 | A | * | 4/1972 | Johnston | A47B 23/004 24/279 |
| 4,109,888 | A | * | 8/1978 | Hayes | G10D 9/00 248/230.5 |
| 4,205,817 | A | * | 6/1980 | Corder | A47B 23/004 248/443 |
| 4,470,571 | A | * | 9/1984 | Hartman | A47B 19/10 248/452 |
| 4,553,728 | A | * | 11/1985 | Corsello | A47B 23/007 248/444.1 |
| 4,832,302 | A | * | 5/1989 | Anderson | G10G 7/00 248/443 |
| 5,102,087 | A | * | 4/1992 | Brunell | A47B 97/02 248/206.5 |
| 5,979,940 | A | * | 11/1999 | Araghi | A47B 23/06 248/441.1 |
| 6,281,417 | B1 | * | 8/2001 | Ladao | G10G 5/00 211/85.6 |
| 7,510,215 | B2 | * | 3/2009 | Lee | A45F 5/12 248/451 |
| 7,546,996 | B2 | * | 6/2009 | Somji | F16M 11/045 248/229.14 |
| 9,027,900 | B2 | * | 5/2015 | Prohofsky | F16M 11/041 248/449 |
| 2014/0328020 | A1 | * | 11/2014 | Galant | F16M 11/105 361/679.56 |

OTHER PUBLICATIONS

Grover-Trophy 10 Window Flip Folio Folder from http://www.musiciansfriend.com/marching-band/grover-trophy-10-window-flip-folio-folder/473722, Apr. 10, 2015.

* cited by examiner

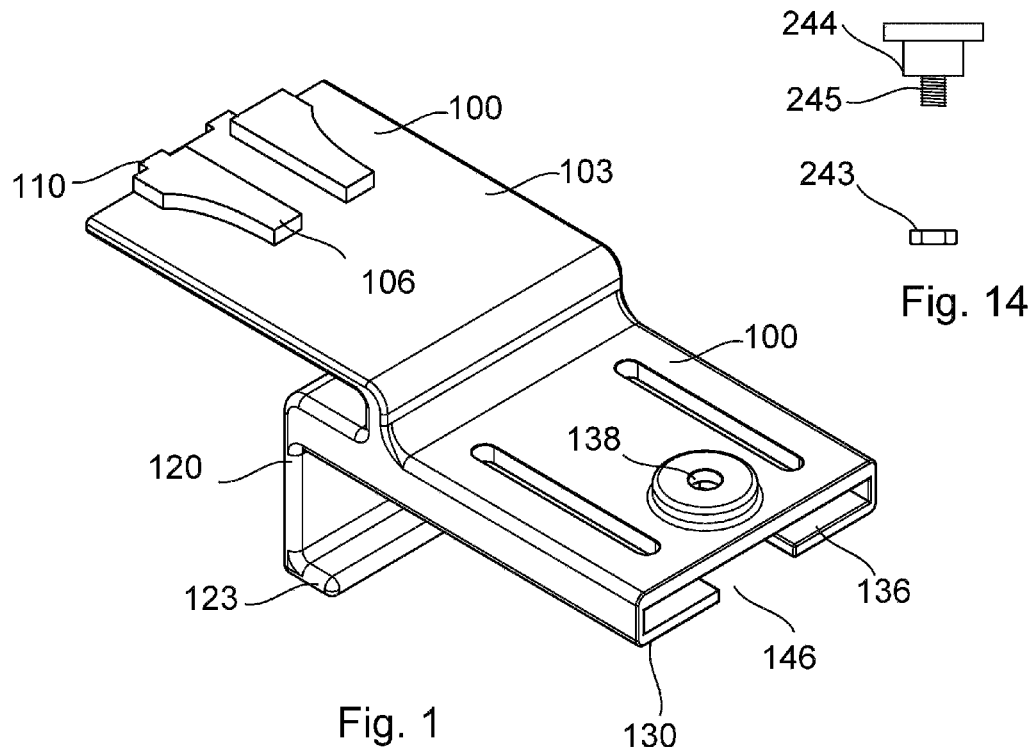
Fig. 14
Fig. 1
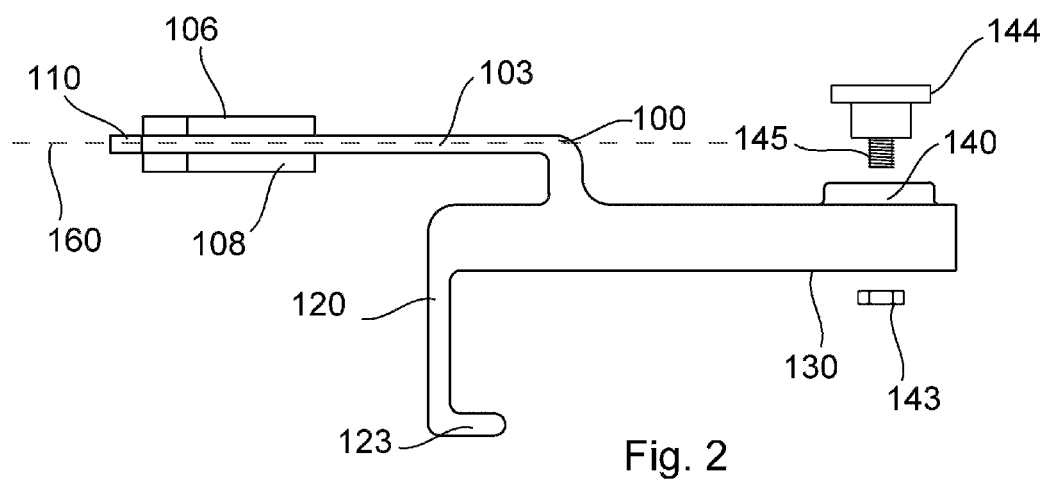
Fig. 2

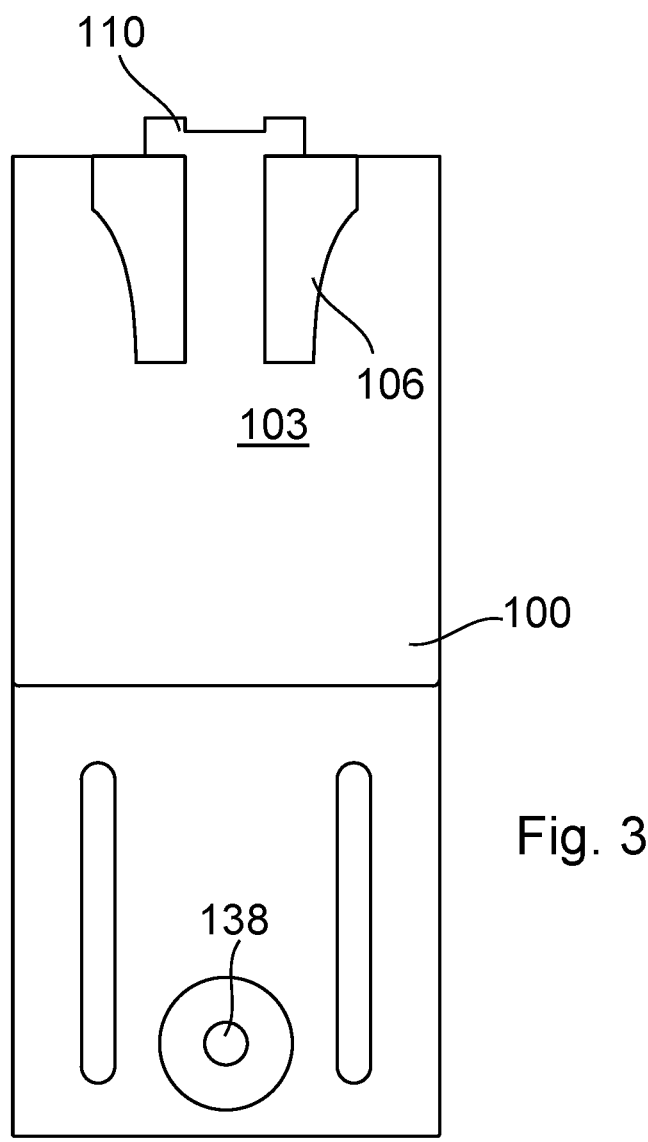
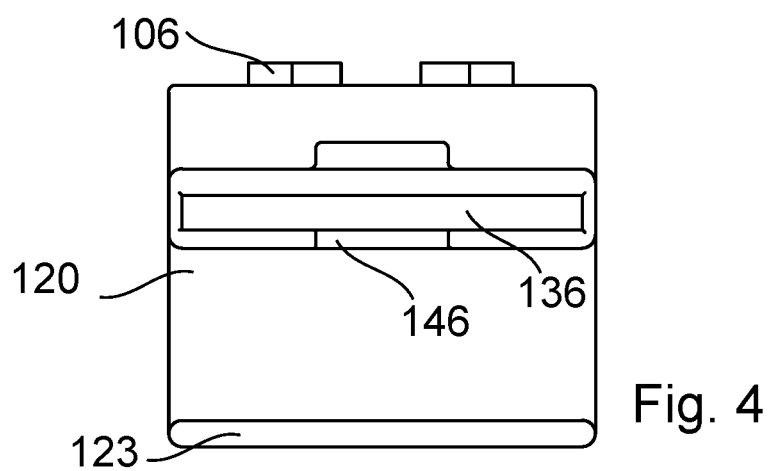

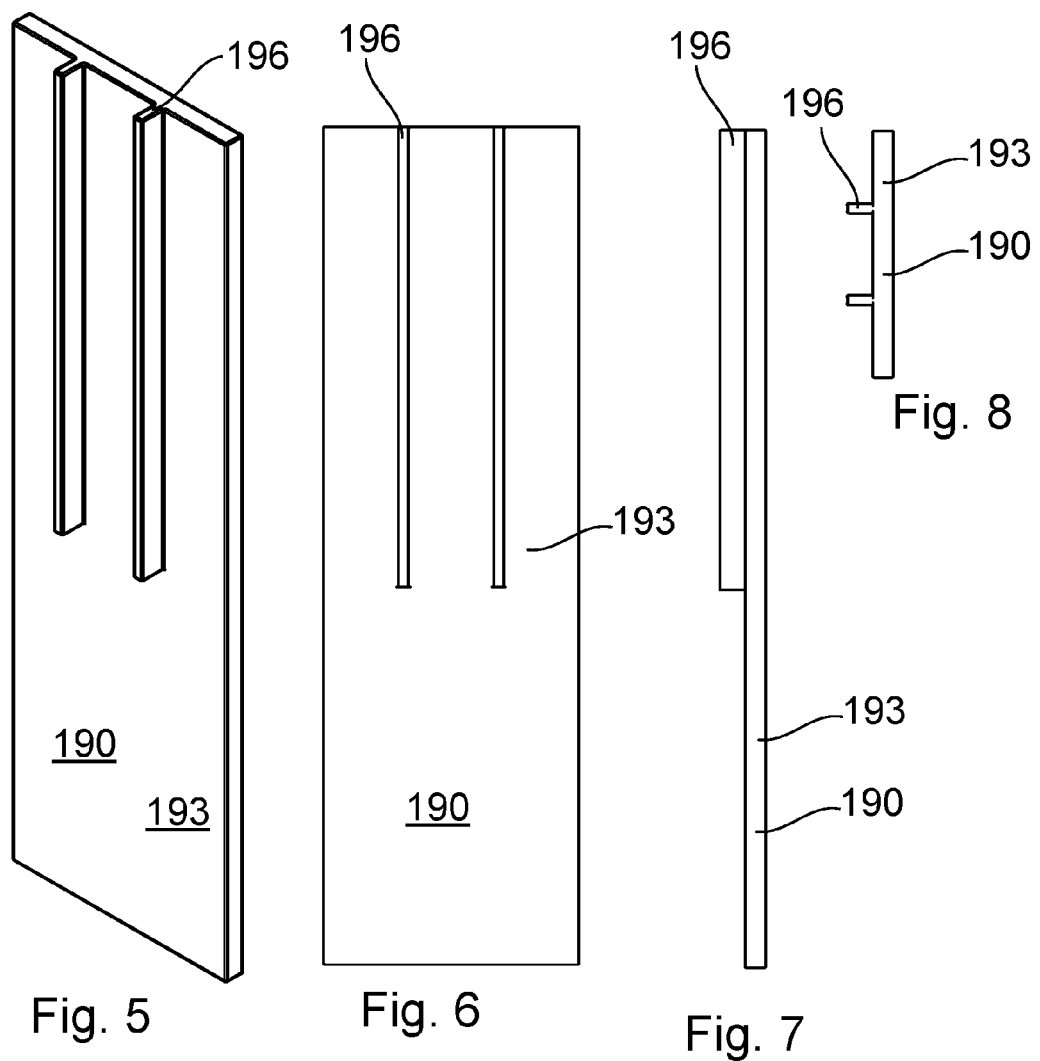

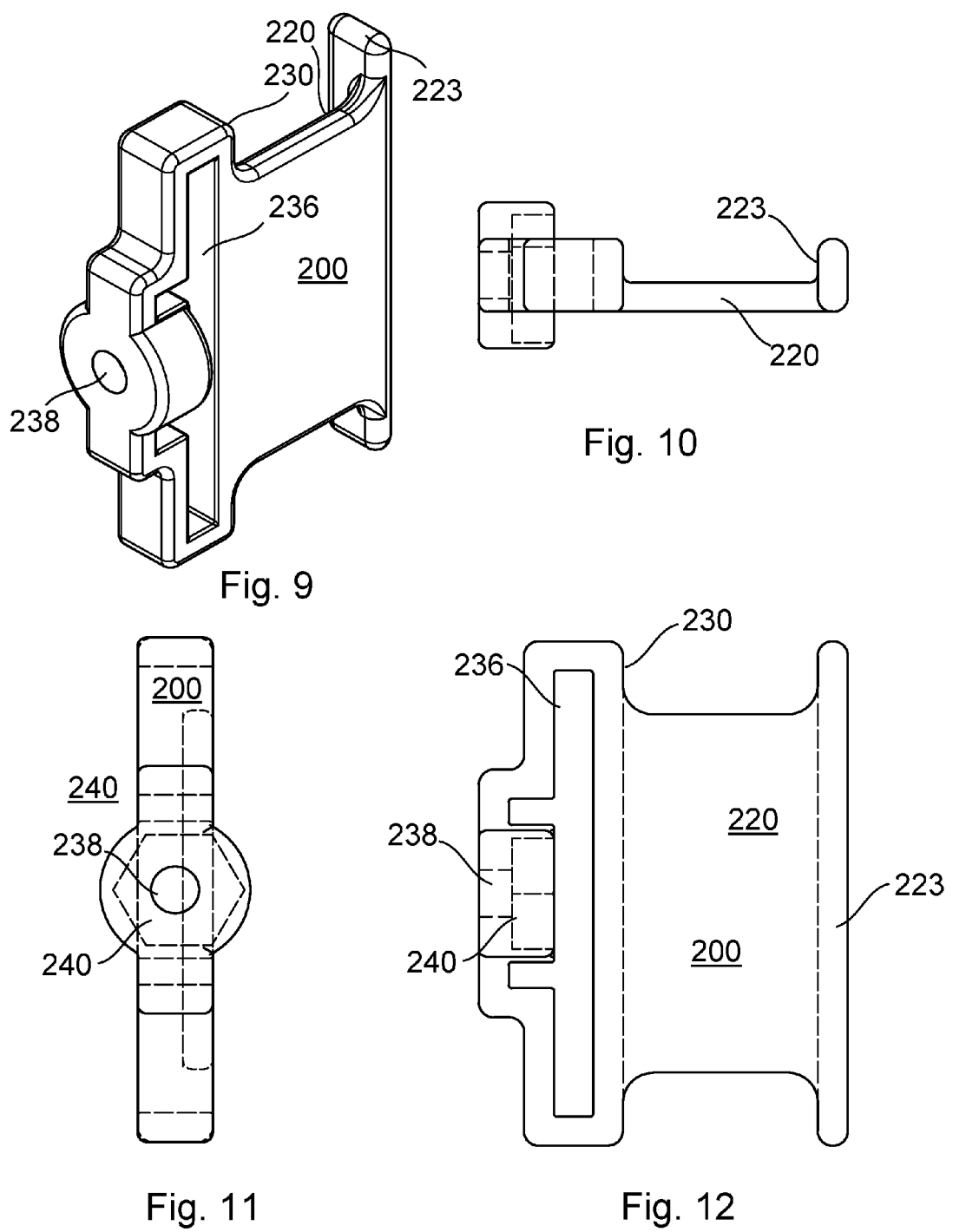

INSTRUMENT MOUNT

This application claims the benefit of provisional application No. 62/147,859 filed on Apr. 15, 2015 and entitled Instrument Mount.

Instrument mounts disclosed herein may be used as an aid in the playing of music and may be particularly useful as an aid for marching bands.

BRIEF DESCRIPTION OF THE DRAWINGS

FIG. 1 shows a perspective view of the base piece.
FIG. 2 shows a side view of the base piece.
FIG. 3 shows a rear view of the base piece.
FIG. 4 shows a plan view of the base piece.
FIG. 5 shows a perspective view of the mount slide.
FIG. 6 shows a rear elevation view of the mount slide.
FIG. 7 shows a side elevation view of the mount slide.
FIG. 8 shows a plan view of the mount slide.
FIG. 9 shows a perspective view of the top clamp.
FIG. 10 shows a side view of the top clamp.
FIG. 11 shows a rear view of the top clamp.
FIG. 12 shows a plan view of the top clamp.
FIG. 14 shows a nut, knob and threaded post.

DETAILED DESCRIPTION

Example 1

Figure 13:
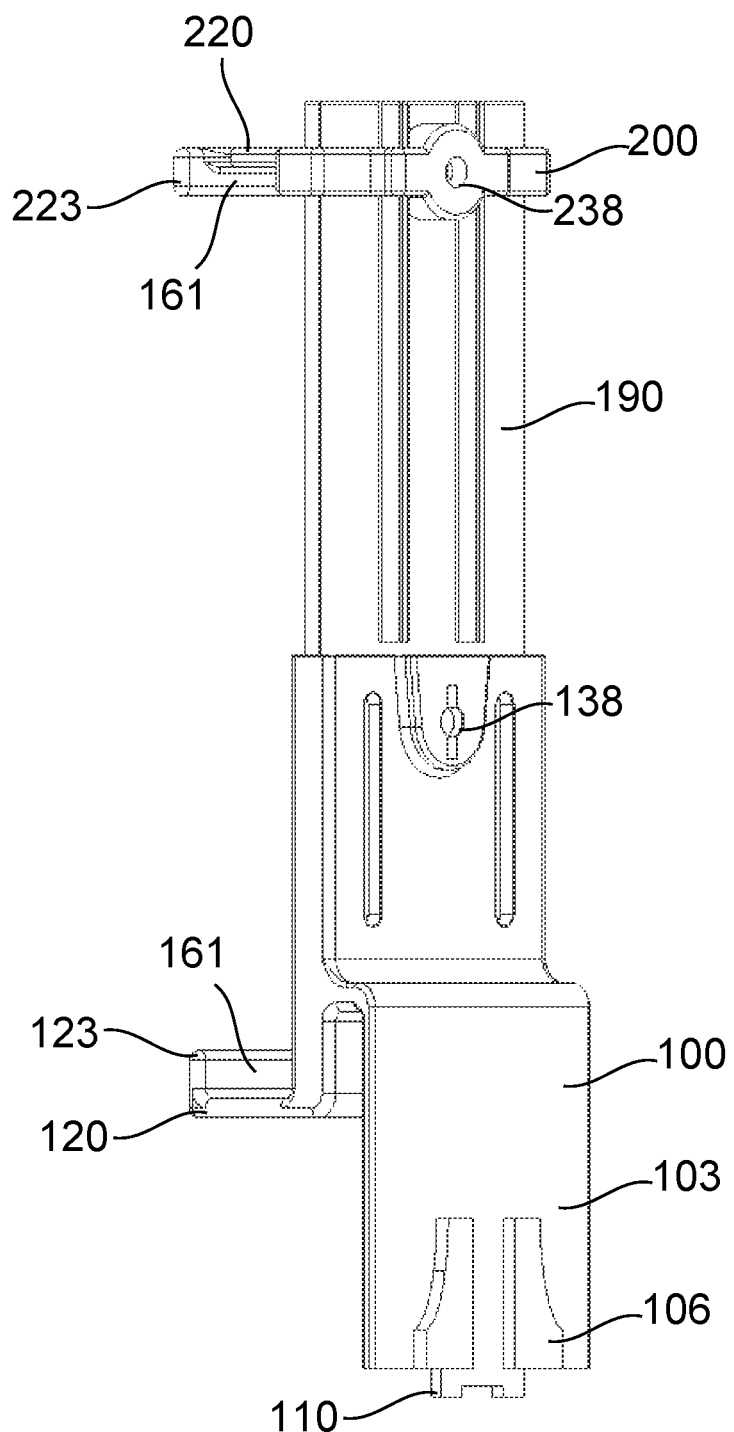
FIG. 13 shows a perspective view of the instrument mount.

A Musical instrument mount 50 may be made up of a Base piece 100, a Mount slide 190 and a Top clamp 200.

Referring now collectively to FIG. 1, FIG. 2, FIG. 3 and FIG. 4 of the drawings, Base piece 100 may contain a Lyre attachment plate 103, a Rear set of lyre attachment projections 106, a Front set of lyre attachment projections 108, a Bottom lyre attachment projection 110, a Bottom clamp grip 120, a Bottom clamp lip 123, a Bottom clamp back 130, a Base slide slot 136, a Bottom bolt hole 138, a Bottom nut receptacle 140, a Bottom nut 143 Bottom knob 144, Bottom threaded post 145, Nut installation recess 146 and Lyre attachment plane 160. Base piece 100 is designed to connect to a lyre which may in turn be connected to a large variety of instruments and Base piece 100 further both supports the remaining components of the instrument mount and partially supports a mobile electronic device, sometimes referred to herein as a "device." The device may be a phone, a tablet, or any number of other apparatus. The device may be configured to display sheet music, digitally or otherwise, such that the user of the instrument mount would be able to conveniently read the sheet music while moving around and playing the instrument. The combination of Rear set of lyre attachment projections 106, Front set of lyre attachment projections 108, and Bottom lyre attachment projection 110 as those elements are situated on Lyre attachment plate 103 are particularly suited to securely hold the instrument mount within the grasp of a lyre type clip or clasp thereby securing the instrument mount against substantial translational or rotational motion as the user moves an instrument through motions such as are typical of playing in a marching band. Lyre attachment plate 103 may be positioned such that Bottom clamp back 130 is located closer to the user of the instrument mount than Lyre attachment plate 103. Lyre attachment plate 103 may be located on Lyre attachment plane 160. Bottom clamp back 130 together with Bottom clamp grip 120 and Bottom clamp lip 123 may securely hold the base of the device. Bottom nut 143 may be located within Base piece 100 and more particularly adjacent to Bottom bolt hole 138 such that Bottom knob 144 having Bottom threaded post 145 may pass through Bottom bolt hole 138 and screw into Bottom nut 143. Base piece 100 may be configured such that the nut may be inserted into a recess adjacent to Bottom bolt hole 138 and the recess may be configured such that the nut is secured against rotation when located in the recess. Insertion of Bottom nut 143 into Base piece 100 may be accomplished by passing Bottom nut 143 through Nut installation recess 146. Base slide slot 136 may be configured to receive the side of Mount slide 190 that does not have Slide guides 196 within Base slide slot 136.

Referring now to FIG. 5, FIG. 6, FIG. 7 and FIG. 8, Mount slide 190 may have a Slide body 193 and Slide guides 196. The portion of Slide body 193 not having Slide guides 196 may be particularly configured to be received within Base slide slot 136. The portion of Mount slide 190 having Slide guides 196 may be particularly configured to be received within Top clamp slide slot 236. Mount slide 190 acts to provide a structural link between Base piece 100 and Top clamp 200, provides rigidity to the instrument mount and may be in tension when a device is secured within the instrument mount. Slide guides 196 may provide additional rigidity to Mount slide 190 and further serve to better position and secure Top clamp 200 relative to Base piece 100.

Referring now to FIG. 9, FIG. 10, FIG. 11, FIG. 12 and FIG. 14, Top clamp 200 may contain a Top clamp grip 220, a Top clamp lip 223, a Top clamp back 230, a Top clamp slide slot 236, a Top bolt hole 238, a Top nut receptacle 240, Top nut 243, Top knob 244 and Top threaded post 245. Top clamp 200 may be positioned on Mount slide 190 such that a device such as a phone or tablet is positioned between Top clamp 200 and Base piece 100 and more particularly between Bottom clamp grip 120 and Top clamp grip 220. When Bottom clamp grip 120 and Top clamp grip 220 are closed around the device, Top clamp lip 223 and Bottom clamp lip 123 prevent the device from being pulled out of the instrument mount in the direction of the user and the combination of Bottom clamp back 130, Top clamp 200 and Top clamp back 230 prevent the device from moving away from the user. A friction fit of the device between Bottom clamp grip 120 and Top clamp grip 220 limits the horizontal movement of the device and generally holds the device in place. Top nut 243 may be placed within Top nut receptacle 240 such that a Top knob 244 and Top threaded post 245 may be inserted through Top bolt hole 238 and screwed in, threading it through Top nut 243, to the point that Top threaded post 245 engages Mount slide 190 fixing Mount slide 190 within Top clamp slide slot 236. The fixing of Mount slide 190 within Base slide slot 136 may occur in a similar fashion.

Referring now to FIG. 13 of the drawings which depicts Musical instrument mount 50, a bottom knob bolt (not shown) and a top knob bolt (not shown) may be used to fix the position of Base piece 100 and Top clamp 200 respectively on Mount slide 190 and may further be used to readjust the relative position of Base piece 100, Top clamp 200 and Mount slide 190 for the purpose of getting a device in the instrument mount, repositioning the device in the instrument mount, adding a device to the instrument mount, removing a device from the instrument mount or changing the device used in the instrument mount. The bottom knob bolt and the top knob bolt screw into Bottom bolt hole 138 and Top bolt hole 238 respectively ultimately pressing against Mount slide 190 securing Base piece 100 and Top clamp 200 in a fixed position relative to Mount slide 190. Further, Bottom clamp grip 120 and Top clamp grip 220 may be configured such that one or both have a compressible pad which may aid in the friction fit of the device between Bottom clamp grip 120 and Top clamp grip 220. The compressible pads may be located at the Compressible pad locations 261 on Bottom clamp grip 120 and Top clamp grip 220 behind Top clamp lip 223 and Bottom clamp lip 123.

The instrument mount may, for example, be configured to hold a cellular telephone clamped between Base piece 100 and Top clamp 200 and held by a lyre such that Rear set of lyre attachment projections 106, Front set of lyre attachment projections 108 and Bottom lyre attachment projection 110 are fixed securely within the clamp of the lyre and such that the lyre is positioned on top of an instrument and carried such that the phone is positioned above the instrument and at or near eye level of the user. The musical instrument may for example be a trumpet or it may be any number of other instruments. The musical instrument may be selected from a cornet, a trumpet, a tuba, a French horn, a clarinet, a flute, an oboe, and a saxophone. The instrument mount may be configured such that the device is positioned above and forward of the lyre. The device may be fixed in place by a friction fit that is secured by screws or bolts.

The instrument mount may be secured to hold a wide variety of devices and may for example hold devices ranging from 2.6 inches high to 7.5 inches high measured as those devices would be oriented for securing between Bottom clamp grip 120 and Top clamp grip 220. The wide range of devices that may be situated within the instrument mount is due in part to the depth of Base slide slot 136 which may for example be 2.3 inches. The depth of Base slide slot 136 may for example be between 1.5 and 3.5 inches. The range of devices that may be situated within the instrument mount is also due in part to the height of Mount slide 190 which may for example be 5.09 inches or may be 5 inches. The height of Mount slide 190 may for example be between 3 inches and 7 inches. Further, the height of Mount slide 190 may for example be between 4 inches and 6 inches. The length of Slide guides 196 may be long enough that when Mount slide 190 is fully inserted within Base slide slot 136 Slide guides 196 rest on Base piece 100.

Further Examples

Mounting apparatus described herein may, for example comprise a base structure; an upper support structure having an upper support pressure structure and an intermediate member; such that the base structure may comprise a lyre clip attachment plate; the lyre clip attachment plate may extend longitudinally away from the base structure; the lyre clip attachment plate may comprise a longitudinal projection configured to securely connect within a lyre clip; the base structure may comprise a base pressure structure configured to contact a mobile electronic device; the upper support structure may be configured to be pinned in a fixed position along the intermediate member; the base structure may be connected to the intermediate member; the intermediate member may be connected to the upper support structure; the lyre clip attachment plate may occupy a lyre clip attachment plane and the upper support structure may be on a device facing side of the lyre clip attachment plane; the lyre clip attachment plate may be adapted to securely fit within and to be held by a lyre clamp and the lyre clip attachment plate may comprise a perpendicular projection configured to limit horizontal movement of the base structure within the lyre clamp. The base structure may for example be Base piece 100. The upper support structure may for example be Top clamp 200. The intermediate member may for example be Mount slide 190. The lyre clip attachment plate may for example be Lyre attachment plate 103. The longitudinal projection may for example be Bottom lyre attachment projection 110. The base pressure structure may for example be Bottom clamp grip 120 either with or without the compressible pad. The perpendicular projection may for example be Front set of lyre attachment projections 108. As used herein, the phrase "device facing side" indicates the side of the mounting apparatus which would face a user during typical operation of the mobile electronic device. In Example 1, the device facing side would be the side opposite the knobs. As used herein, the "lyre clip attachment plane" would pass between the two gripping portions of the lyre clip that contact the base structure. As that term is used herein, "lyre clip" designates a clip having connection structures matching typical commercially available clips having an ornamental appearance resembling a lyre and sometimes used to connect flip folders with sheet music to an instrument such as a wind instrument. In a related example, the base structure may be configured for free standing connection to an instrument by the lyre clamp such that the lyre clamp is the sole connection between the instrument and the base structure.

Mounting apparatus described herein may, for example comprise a base structure; an upper support structure having an upper support pressure structure and an intermediate member; such that the base structure may comprise a lyre clip attachment plate; the lyre clip attachment plate may extend longitudinally away from the base structure; the lyre clip attachment plate may comprise a longitudinal projection configured to securely connect within a lyre clip; the base structure may comprise a base pressure structure configured to contact a mobile electronic device; the base structure may be connected to the intermediate member; the intermediate member may be connected to the upper support structure; the upper support structure may be configured to be pinned in a fixed position along the intermediate member; the intermediate member may be between 4 inches and 6 inches tall; the upper support structure may partially enclose a first portion of the intermediate member and the base structure may enclose and partially support a second portion of the intermediate member. In a related example, the upper support structure may have a first track; the intermediate member may have a first rail and the first rail may be configured to slide within the first track. The first rail may for example be one of Slide guides 196 and the first track may be one of the tracks associated with Top clamp slide slot 236 that guide the rails. In a related example, the upper support structure may be located vertically above the longitudinal projection. In a related example, the upper support pressure structure is arranged to apply pressure to the mobile electronic device pressing the mobile electronic device against the base pressure structure. In a related example, the upper support pressure structure is configured to have a range of motion sufficient to accommodate the mobile electronic device, the mobile electronic device having a height of up to 7.5 inches between the upper support pressure structure and the base pressure structure. "Height," as that term is used herein to describe mobile electronic devices indicates the dimension of the mobile electronic device that may be fixed between the base pressure structure and the upper support pressure structure or in the case of Example 1 between Bottom clamp grip 120 and Top clamp grip 220. In a related example, the upper support pressure structure and the base pressure structure are configured to clamp the mobile electronic device in-between the upper support pressure structure and the base pressure structure utilizing pressing forces thereby placing the intermediate member under tension. In a related example, the intermediate member is configured to be slidably insertable into both the base structure and the upper support structure. In a related example, the upper support structure may be located vertically above the longitudinal projection; the upper support pressure structure may be arranged to apply pressure to the mobile electronic device while pressing the mobile electronic device against the base pressure structure; the upper support pressure structure may be configured to have a range of motion sufficient to accommodate the mobile electronic device, thereby accommodating a mobile electronic device height of up to 7.5 inches between the upper support pressure structure and the base pressure structure; the upper support pressure structure and the base pressure structure may be configured to clamp the mobile electronic device in-between the upper support pressure structure and the base pressure structure utilizing pressing forces thereby placing the intermediate member under tension and the intermediate member may be configured to be slidably insertable into both the base structure and the upper support structure. In a related example, the mounting apparatus may further comprise a compressible pad attached to a member selected from the base pressure structure and the upper support pressure structure.

Mounting apparatus described herein may, for example comprise a base structure; an upper support structure having an upper support pressure structure and an intermediate member; such that the base structure may comprise a lyre clip attachment plate; the lyre clip attachment plate may extend longitudinally away from the base structure; the lyre clip attachment plate may comprise a longitudinal projection configured to securely connect within a lyre clip; the base structure may comprise a base pressure structure configured to contact an electronic device; the intermediate member may be between 3 inches and 7 inches tall; the base structure may be connected to the intermediate member; the intermediate member may be connected to the upper support structure; the upper support structure may be slidably positionable along the intermediate member and the intermediate member may be slidably positionable within the base structure. In a related example, the mounting apparatus may further comprise a first knob attached to a first threaded post; the upper support structure may be configured to be pinned in a fixed position along the intermediate member by the first threaded post and the first threaded post may be configured to be threaded through a first nut that is partially enclosed within the upper support structure. Threaded posts may, for example, take the form of a bolt or a set screw. In a related example, the mounting apparatus may further comprise a second knob attached to a second threaded post; the intermediate member may be configured to be pinned within the base structure by the second threaded post and the second threaded post may be configured to be threaded through a second nut that is partially enclosed within the base structure. In a related example, the bottommost extent of the intermediate member may be fully encompassed by the base structure. In a related example, the base structure may comprise a lower support lip configured to retain the mobile electronic device. In a related example, the upper support structure may comprise an upper support lip configured to retain the mobile electronic device from moving forward. In a related example, the mounting apparatus may further comprise a first knob attached to a first threaded post and a second knob attached to a second threaded post; such that the upper support structure may be configured to be pinned in a fixed position along the intermediate member by the first threaded post; wherein the first threaded post is configured to be threaded through a first nut that is partially enclosed within the upper support structure; the intermediate member may be configured to be pinned within the base structure by the second threaded post; the second threaded post may be configured to be threaded through a second nut that is partially enclosed within the base structure; the bottommost extent of the intermediate member may be fully encompassed by the base structure; the base structure may comprise a lower support lip configured to retain the mobile electronic device and the upper support structure may comprise an upper support lip configured to retain the mobile electronic device from moving forward.

The above-described embodiments have a number of independently useful individual features that have particular utility when used in combination with one another including combinations of features from embodiments described separately. There are, of course, other alternate embodiments which are obvious from the foregoing descriptions of the invention, which are intended to be included within the scope of the invention.

What is claimed is:

1. A mounting apparatus comprising:
   a. a base structure comprising a base pressure structure configured to contact a mobile electronic device, a planar attachment portion lying on a first plane, a first projection, a first pair of projections and a second pair of projections;
   b. an upper support structure having an upper support pressure structure;
   c. an intermediate member comprising an upper planar portion and a lower planar portion;
   d. a first knob attached to a first threaded post wherein the upper support structure is configured to be pinned in a fixed position along the intermediate member by the first threaded post and wherein the first threaded post is configured to be threaded through a first nut that is located within the upper support structure and that is partially enclosed within the upper support structure and
   e. a second knob attached to a second threaded post wherein the intermediate member is configured to be pinned within the base structure by the second threaded post and wherein the second threaded post is configured to be threaded through a second nut that is located within the base structure and that is partially enclosed within the base structure;
   f. wherein the intermediate member comprises a pair of rails projecting from the upper planar portion;
   g. wherein the upper support structure comprises an opening configured to accommodate the upper planar portion and the pair of rails;
   h. wherein the first projection lies on the first plane and extends from the planar attachment portion in a first direction away from the upper support structure;
   i. wherein the first pair of projections projects from the planar attachment portion in a second direction, the second direction being normal to the first plane;
   j. wherein the second pair of projections projects from the planar attachment portion in a third direction, the third direction being opposite the second direction;
   k. wherein the intermediate member is between 3 inches and 7 inches tall;
   l. wherein the base structure is connected to the intermediate member;

m. wherein the intermediate member is connected to the upper support structure;
n. wherein the upper support structure is slidably positionable along the intermediate member and
o. wherein the intermediate member is slidably positionable within the base structure.

2. The mounting apparatus of claim 1 wherein a bottommost extent of the intermediate member is fully encompassed by the base structure.

3. The mounting apparatus of claim 1 wherein the base structure comprises a lower support lip configured to retain the mobile electronic device.

4. The mounting apparatus of claim 1 wherein the upper support structure comprises an upper support lip configured to retain the mobile electronic device from moving forward.

5. The mounting apparatus of claim 1 further comprising
a. wherein a bottommost extent of the intermediate member is fully encompassed by the base structure;
b. wherein the base structure comprises a lower support lip configured to retain the mobile electronic device and
c. wherein the upper support structure comprises an upper support lip configured to retain the mobile electronic device from moving forward.

6. A mounting apparatus comprising:
a. a base structure comprising:
 i. a planar attachment portion,
 ii. a first trough comprising a first lip,
 iii. a first slot, a first projection,
 iv. a first pair of projections and
 v. a second pair of projections;
b. an intermediate member comprising an upper planar portion and a lower planar portion;
c. an upper support structure comprising a second trough with the second trough comprising a second lip;
d. wherein the lower planar portion is fastened within the first slot;
e. wherein the intermediate member comprises a pair of rails projecting from the upper planar portion;
f. wherein the upper support structure comprises an opening configured to accommodate the upper planar portion and the pair of rails;
g. wherein the upper planar portion is fastened inside the opening;
h. wherein the planar attachment portion lies in a first plane;
i. wherein the first projection lies on the first plane and extends from the planar attachment portion in a first direction away from the upper support structure;
j. wherein the first pair of projections projects from the planar attachment portion in a second direction, the second direction being normal to the first plane;
k. wherein the second pair of projections projects from the planar attachment portion in a third direction, the third direction being opposite the second direction; and
l. wherein the first lip and the second lip are arranged and configured to retain an object adjacent to the intermediate member when the object is gripped between the first trough and the second trough.

* * * * *